United States Patent
Hanson et al.

(10) Patent No.: US 9,305,299 B1
(45) Date of Patent: Apr. 5, 2016

(54) SYSTEM, METHOD, AND COMPUTER PROGRAM FOR PROACTIVELY IDENTIFYING AND ADDRESSING CUSTOMER NEEDS

(71) Applicant: Amdocs Software Systems Limited, Dublin (IE)

(72) Inventors: Craig Dean Hanson, Elk Grove, CA (US); Joseph Patrick O'Hara, Poole (GB); Shanmugam Chinnappa Gounder, Ashburn, VA (US)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/286,951

(22) Filed: May 23, 2014

Related U.S. Application Data

(60) Provisional application No. 61/827,681, filed on May 27, 2013.

(51) Int. Cl.
*G06Q 30/00* (2012.01)
*H04M 3/51* (2006.01)
*G06Q 10/04* (2012.01)

(52) U.S. Cl.
CPC ............ *G06Q 30/016* (2013.01); *G06Q 10/04* (2013.01); *H04M 3/5183* (2013.01)

(58) Field of Classification Search
CPC ............ H04M 3/5183; H04M 3/5191; G06Q 30/016; G06Q 10/04
USPC .............. 379/265.09, 265.1, 266.08; 705/304
See application file for complete search history.

(56) References Cited

U.S. PATENT DOCUMENTS

| | | | |
|---|---|---|---|
| 8,521,572 B2 | 8/2013 | Hanson et al. | |
| 2009/0222313 A1* | 9/2009 | Kannan et al. | 705/9 |
| 2011/0299676 A1* | 12/2011 | Hanson et al. | 379/265.03 |

OTHER PUBLICATIONS

Chessell et al., "Smarter Analytics: Driving Customer Interactions with the IBM Next Best Action Solution," IBM Corp., 2012, pp. 1-36, retrieved from http://www.redbooks.ibm.com/redpapers/pdfs/redp4888.pdf.

* cited by examiner

*Primary Examiner* — Antim Shah
(74) *Attorney, Agent, or Firm* — Zilka-Kotab, PC

(57) ABSTRACT

A system, method, and computer program product are provided for proactively identifying and addressing customer needs. In use, at least one customer need for at least one customer is predicted, based, at least in part, on information associated with the one or more detected customer care request triggering events, information associated with the one or more customer care interactions, and information associated with the one or more after-effects.

12 Claims, 4 Drawing Sheets

SYSTEM, METHOD, AND COMPUTER PROGRAM FOR PROACTIVELY IDENTIFYING AND ADDRESSING CUSTOMER NEEDS

CLAIM OF PRIORITY

This application claims the benefit of U.S. Provisional Application No. 61/827,681, filed May 27, 2013, the entire contents of which are incorporated herein by reference.

FIELD OF THE INVENTION

The present invention relates generally to customer care and specifically to proactive customer care.

BACKGROUND

Customer care is a typically reactive process. When seeking customer service, the customer typically initiates contact to a customer care center via a phone call, an e-mail, online chat or may submit an online request. Receipt of the request then leads to investigation of the request and ultimately to providing the necessary care. However, with the advent of monitoring of customer activity, the customer care process is transitioning from a reactive service to a proactive service.

There is thus a need for addressing these and/or other issues associated with the prior art.

SUMMARY

A system, method, and computer program product are provided for proactively identifying and addressing customer needs. In use, one or more systems are monitored for at least one customer care request triggering event. Additionally, one or more customer care request triggering events are detected in the one or more systems. Information associated with the one or more detected customer care request triggering events is stored. Further, one or more customer care interactions associated with the one or more detected customer care request triggering events are identified. Information associated with the one or more customer care interactions is stored. Additionally, one or more after-effects associated with the one or more detected customer care request triggering events are detected. Information associated with the one or more after-effects are stored. Furthermore, at least one customer need for at least one customer is predicted, based, at least in part, on the information associated with the one or more detected customer care request triggering events, the information associated with the one or more customer care interactions, and the information associated with the one or more after-effects.

DETAILED DESCRIPTION

Figure 1:
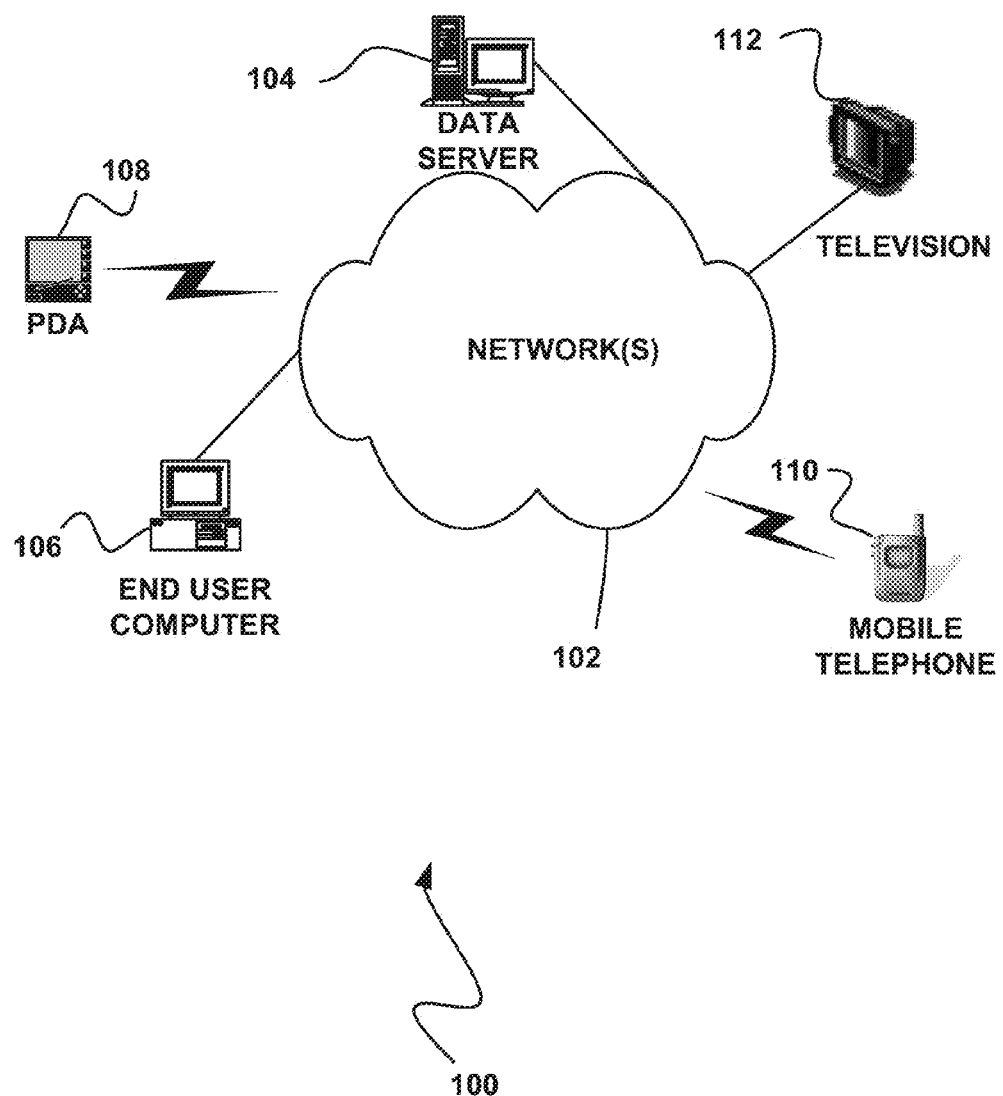
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
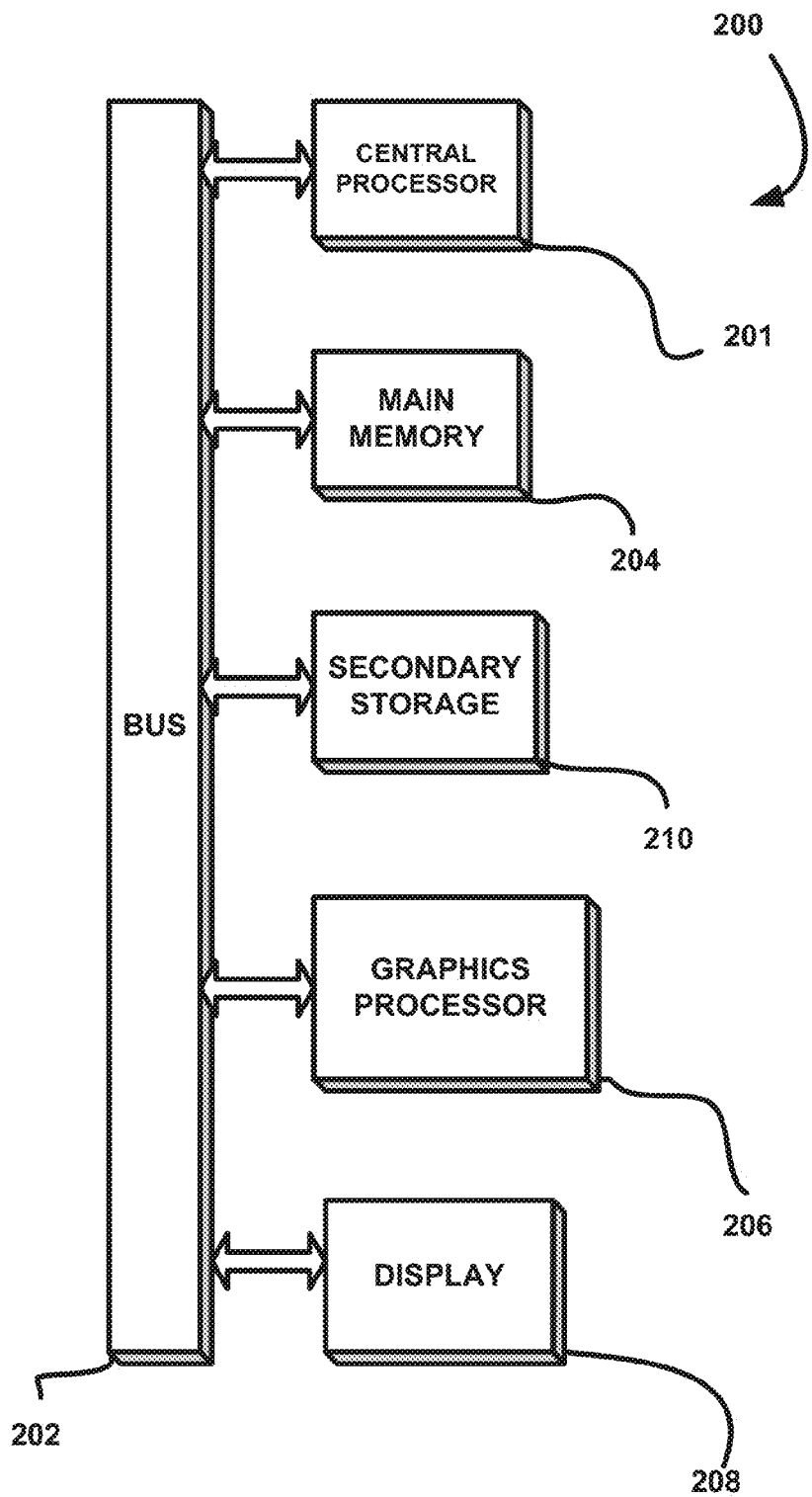
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
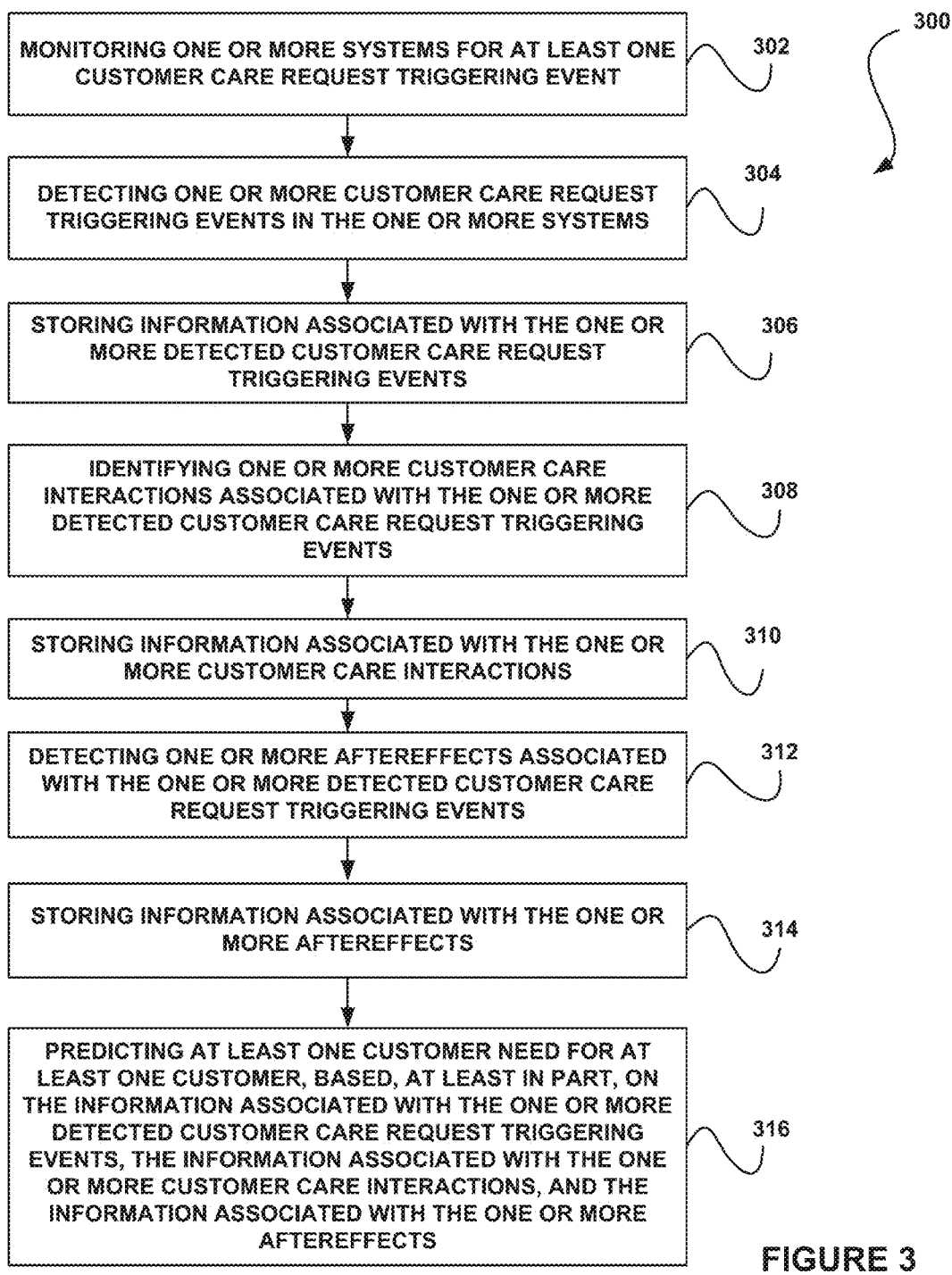
FIG. 3 illustrates a method for proactively identifying and addressing customer needs, in accordance with one embodiment.

FIG. 3 illustrates a method 300 for proactively identifying and addressing customer needs, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, one or more systems are monitored for at least one customer care request triggering event. See operation 302. In the context of the present description, a customer care request triggering event refers to any event determined to be associated with the need or potential need for customer care.

For example, in one embodiment, the customer care request triggering event may include an event indicating a deviation from an expected behavior of a customer. For example, a customer may stop sending text messages, using data, or making calls, etc., thus indicating abnormal activity for the customer.

In another embodiment, the detected customer care request triggering event may include an event predicted to negatively impact an experience of the customer. For example, the customer care request triggering event may include a service becoming unavailable to the customer (e.g. a data usage service, an unlimited texting service, etc.). As another example, the customer care request triggering event may include the customer receiving an abnormally high bill, or an abnormally high bill being generated (e.g. abnormal based on the customer's historical data, etc.).

Various data may be used to determine triggering events, such as historical data associated with the customer. Additionally, in various embodiments, the customer care request triggering events may be associated with one or more products or services.

Further, the systems being monitored may include any system associated with a customer. For example, in various embodiments, the systems may include billing systems, ordering systems, customer care systems, retailer systems, telecommunications provider systems, networks, and/or any other type of system associated with a customer of a service or product.

As shown further in FIG. 3, one or more customer care request triggering events are detected in the one or more systems. See operation 304.

Further, information associated with the one or more detected customer care request triggering events is stored. See operation 306. The information may include any information associated with the triggering event and/or an associated customer. Furthermore, the information may be stored in any database, repository, memory system, and/or combinations thereof.

Further, one or more customer care interactions associated with the one or more detected customer care request triggering events are identified. See operation 308.

The customer care interactions may include any interaction between the customer and/or a service representative or product representative, etc. For example, the customer care interactions may be between the customer and a customer care representative (e.g. a technical representative, a quality representative, a satisfaction representative, etc.).

In one embodiment, the customer care interaction may include a telephone call. As another example, the customer care interaction may include an e-mail. As another example, the customer care interaction may include an online instant message exchange (e.g. a chat session, etc.).

Information associated with the one or more customer care interactions is stored. See operation 310. The information may include any information associated with the customer care interaction, including a recording of the interaction. Furthermore, the information may be stored in any database, repository, memory system, and/or a combination thereof.

Additionally, one or more after-effects associated with the one or more detected customer care request triggering events are detected. See operation 312. The after-effects may include any unusual activity performed by the customer or any routine activity suddenly not performed by the customer.

As an example, the after-effects may include cancellation of a data plan or other service by the customer. As another example, the one or more after-effects may include cessation of sending text messages or making calls by the customer.

Further, information associated with the one or more after-effects are stored. See operation 314. The information may include any information associated with the after-effects. Furthermore, the information may be stored in any database, repository, memory system, and/or a combination thereof.

As shown further in FIG. 3, at least one customer need for at least one customer is predicted, based, at least in part, on the information associated with the one or more detected customer care request triggering events, the information associated with the one or more customer care interactions, and the information associated with the one or more after-effects. See operation 316. For example, the stored information may be analyzed and evaluated in order to correctly predict the needs of the customer in a case of a future occurrence of a similar triggering event, etc.

The predicted customer need may include various needs. For example, the predicted customer need may include a need to resolve an issue the at least one customer is having with a service. As another example, the predicted need may include a need to resolve an issue with a charge. As another example, the predicted need may include a need to resolve an issue with a device.

Still yet, in one embodiment, the method 300 may include assigning a severity level and/or a priority level to the predicted need. Moreover, the customer need may be addressed for the customer.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
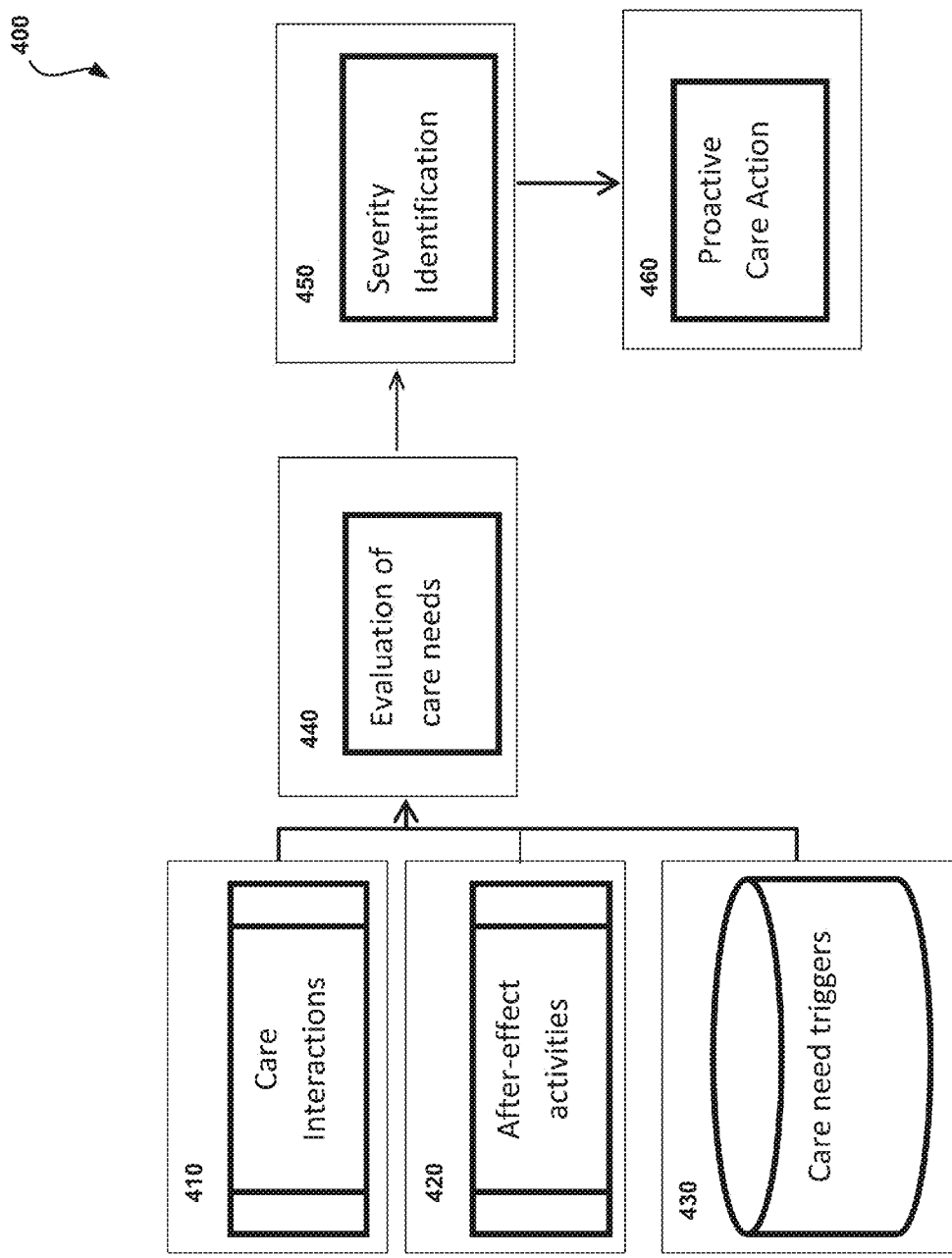
FIG. 4 illustrates system for proactively identifying and addressing customer needs, in accordance with one embodiment.

FIG. 4 illustrates system 400 for proactively identifying and addressing customer needs, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes triggering events monitoring functionality 430, which is operable for monitoring and storing customer care request triggering events. A triggering event may be any deviation from an expected behavior of any of the operational systems pertaining to a particular customer that may cause a customer service issue for the customer.

For example, the triggering event may include a service becoming unavailable to a customer or receipt of an exceptionally high bill by a customer for services rendered. The triggering event may include an occurrence of an event that may negatively impact the customer's experience with a service or with a product.

The system 400 also includes customer care interaction monitoring functionality 410 which is operable for continuously monitoring and recording the customer care interactions corresponding to the triggering events monitored and stored by the triggering events monitoring functionality 430. The customer care interactions may be, for example, a telephone call, an e-mail or a chat submitted by the customer in a time period after the occurrence of a customer care trigger event.

The system 400 also includes functionality 420 for recording of all the after-effects of a triggering event, irrespective of the subsequent occurrence of a corresponding customer care interaction. The after-effects may be, for example, any unusual activity performed by the customer or any routine activity suddenly not performed by the customer. For example, the after-effects may include the cancellation of a data plan by a customer after being charged for over usage, or cessation of sending text messages by a customer after being charged for text messages.

The information collected by elements 410, 420 and 430 constitutes a rich data set which may be analyzed and evaluated by customer need evaluation functionality 440 in order to correctly predict the needs of a customer in a case of a future occurrence of a similar triggering event.

Such a need may be, for example, the need to resolve an issue a customer is having with the service the customer is receiving. The need may also be associated with the provider, such as an issue with a charge, a service issue or a device related issue.

Subsequent to evaluation by evaluation functionality 440, a severity level is assigned to the need of the customer by severity assigning functionality 450. The need is then further prioritized and\or quantified in order to take meaningful and timely proactive action. Once the customer need is identified, evaluated and prioritized, the need can then be proactively addressed by a proactive care action subsystem 460. This may include automatically addressing the need.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   detecting a first event associated with a customer within a system;
   predicting that the detected first event will have a predetermined impact on the customer;
   storing within the system information associated with the detected event, including an indication of one or more products and services associated with the event, a description of the event, and an identification of the customer that is predicted to be negatively impacted;
   identifying a plurality of interactions between the customer and a customer care representative that are associated with the first event, including a telephone call between the customer and the customer care representative, an e-mail between the customer and the customer care representative, and an online instant message exchange between the customer and the customer care representative;
   storing a record of each of the identified plurality of interactions between the customer and the customer care representative that are associated with the first event;
   detecting a plurality of after-effects associated with the first event, the plurality of after-effects including the performance of one or more actions by the user that had not been performed by the user before the first event and the failure of the user to perform one or more actions performed a plurality of times by the user before the first event;
   storing information associated with the plurality of detected after-effects associated with the first event, the information including a description of each of the plurality of detected after-effects;
   predicting a customer need associated with the customer when a second event occurs after the first event, utilizing the stored information associated with the detected event, the stored records of each of the identified plurality of interactions between the customer and the customer care representative that are associated with the first event, and the stored information associated with the plurality of detected after-effects associated with the first event; and
   addressing the predicted customer need associated with the customer.

2. The computer program product of claim 1, wherein the first event includes a deviation from an expected behavior of the customer, based on historical data associated with the customer.

3. The computer program product of claim 1, wherein the first event includes a service becoming unavailable to the customer.

4. The computer program product of claim 1, wherein the event includes a receipt of an abnormally high bill by the customer.

5. The computer program product of claim 1, wherein the plurality of detected after-effects include cancellation of a data plan by the customer.

6. The computer program product of claim 1, wherein the plurality of detected after-effects include cessation of sending text messages by the at least one customer.

7. The computer program product of claim 1, wherein the predicted customer need includes a need to resolve an issue the customer is having with a service.

8. The computer program product of claim 1, wherein the predicted customer need includes a need to resolve an issue with a charge.

9. The computer program product of claim 1, wherein the predicted customer need includes a need to resolve an issue with a device.

10. The computer program product of claim 1, further comprising computer code for assigning at least one of a severity level and a priority level to the customer need.

11. A method, comprising:
    detecting a first event associated with a customer within a system;
    predicting that the detected first event will have a predetermined impact on the customer;
    storing within the system information associated with the detected event, including an indication of one or more products and services associated with the event, a description of the event, and an identification of the customer that is predicted to be negatively impacted;
    identifying a plurality of interactions between the customer and a customer care representative that are associated with the first event, including a telephone call between the customer and the customer care representative, an e-mail between the customer and the customer care representative, and an online instant message exchange between the customer and the customer care representative;
    storing a record of each of the identified plurality of interactions between the customer and the customer care representative that are associated with the first event;
    detecting a plurality of after-effects associated with the first event, the plurality of after-effects including the performance of one or more actions by the user that had not been performed by the user before the first event and the failure of the user to perform one or more actions performed a plurality of times by the user before the first event;
    storing information associated with the plurality of detected after-effects associated with the first event, the information including a description of each of the plurality of detected after-effects;
    predicting a customer need associated with the customer when a second event occurs after the first event, utilizing the stored information associated with the detected event, the stored records of each of the identified plurality of interactions between the customer and the customer care representative that are associated with the first event, and the stored information associated with the plurality of detected after-effects associated with the first event; and addressing the predicted customer need associated with the customer, utilizing a hardware processor.

12. A system comprising:

a memory system; and one or more processing cores coupled to the memory system and that are each configured for:

detecting a first event associated with a customer within a system;

predicting that the detected first event will have a predetermined impact on the customer;

storing within the system information associated with the detected event, including an indication of one or more products and services associated with the event, a description of the event, and an identification of the customer that is predicted to be negatively impacted;

identifying a plurality of interactions between the customer and a customer care representative that are associated with the first event, including a telephone call between the customer and the customer care representative, an e-mail between the customer and the customer care representative, and an online instant message exchange between the customer and the customer care representative;

storing a record of each of the identified plurality of interactions between the customer and the customer care representative that are associated with the first event;

detecting a plurality of after-effects associated with the first event, the plurality of after-effects including the performance of one or more actions by the user that had not been performed by the user before the first event and the failure of the user to perform one or more actions performed a plurality of times by the user before the first event;

storing information associated with the plurality of detected after-effects associated with the first event, the information including a description of each of the plurality of detected after-effects;

predicting a customer need associated with the customer when a second event occurs after the first event, utilizing the stored information associated with the detected event, the stored records of each of the identified plurality of interactions between the customer and the customer care representative that are associated with the first event, and the stored information associated with the plurality of detected after-effects associated with the first event; and addressing the predicted customer need associated with the customer.

* * * * *